(12) United States Patent
Felten

(10) Patent No.: US 9,889,535 B2
(45) Date of Patent: Feb. 13, 2018

(54) METHOD FOR BLOCKING AN OPTICAL LENS COMPONENT

(71) Applicant: ESSILOR INTERNATIONAL (COMPAGNIE GENERALE D'OPTIQUE), Charenton le Pont (FR)

(72) Inventor: Yohann Felten, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 411 days.

(21) Appl. No.: 14/652,437

(22) PCT Filed: Dec. 13, 2013

(86) PCT No.: PCT/EP2013/076489
§ 371 (c)(1),
(2) Date: Jun. 15, 2015

(87) PCT Pub. No.: WO2014/090978
PCT Pub. Date: Jun. 19, 2014

(65) Prior Publication Data
US 2015/0306722 A1 Oct. 29, 2015

(30) Foreign Application Priority Data

Dec. 13, 2012 (EP) ..................................... 12306579

(51) Int. Cl.
*B24B 13/005* (2006.01)
*B32B 37/12* (2006.01)
(Continued)

(52) U.S. Cl.
CPC ........ *B24B 13/0057* (2013.01); *B24B 13/005* (2013.01); *B32B 37/04* (2013.01);
(Continued)

(58) Field of Classification Search
CPC .............. B24B 13/005; B24B 13/0057; B32B 2551/00; B32B 37/04; B32B 37/12; B32B 37/18
See application file for complete search history.

(56) References Cited

U.S. PATENT DOCUMENTS 5,885,700 A * 3/1999 Weldon ............... B24B 13/0057
351/159.02
6,036,313 A * 3/2000 Benjamin ........... B24B 13/0057
351/159.01
(Continued)

FOREIGN PATENT DOCUMENTS

DE 23 12 872 9/1974
GB 1 154 360 6/1969
(Continued)

*Primary Examiner* — Marc Carlson
(74) *Attorney, Agent, or Firm* — Oblon, McClelland, Maier & Neustadt, L.L.P.

(57) ABSTRACT

A lens blocking/deblocking method/device to adhere an ophthalmic lens to a lens holding block A method for blocking an optical lens component (100) on holding unit (200) having bottom part (230) inserted and fixed in lens machining tool (400) and an upper part (250) having upper assembling surface (210) and external side parts (241). The method provides the optical lens component (100) with layer (320) of one-side adhesive tape arranged on bottom of component (100) to cover at least partially bottom (120); (S20) providing thermoplastic material on upper assembling surface (210). The thermoplastic material is heated where a part thereof flows under moderate pressure; (S30) placing the optical lens (100) with layer (320) on thermoplastic material when the thermoplastic is softened; (S40) applying pushing force (P1) on the optical lens (100), to spread the thermoplastic between layer (320) and upper assembling surface (210) and covers external side parts (241).

10 Claims, 7 Drawing Sheets

(51) Int. Cl.
 *B32B 37/18* (2006.01)
 *B32B 37/04* (2006.01)
(52) U.S. Cl.
 CPC .............. *B32B 37/12* (2013.01); *B32B 37/18* (2013.01); *B32B 2551/00* (2013.01)

(56) References Cited

U.S. PATENT DOCUMENTS

| | | | |
|---|---|---|---|
| 6,835,204 B1 | 12/2004 | Stork et al. | |
| 6,863,602 B2 * | 3/2005 | Incera | B24B 13/0052 451/384 |
| 9,327,380 B2 * | 5/2016 | Felten | B24B 13/0052 |
| 2008/0051017 A1 * | 2/2008 | Jiang | B24B 9/146 451/384 |
| 2011/0031637 A1 * | 2/2011 | Felten | B24B 13/0057 264/2.7 |
| 2011/0124272 A1 * | 5/2011 | Felten | B24B 13/0057 451/42 |
| 2012/0074602 A1 * | 3/2012 | Felten | B24B 13/0057 264/2.5 |
| 2012/0224140 A1 * | 9/2012 | Felten | B24B 13/0057 351/159.73 |

FOREIGN PATENT DOCUMENTS

| | | | | |
|---|---|---|---|---|
| WO | WO 2010-052248 | | 5/2010 | |
| WO | WO 2010136363 A1 * | | 12/2010 | ......... B24B 13/0052 |

* cited by examiner

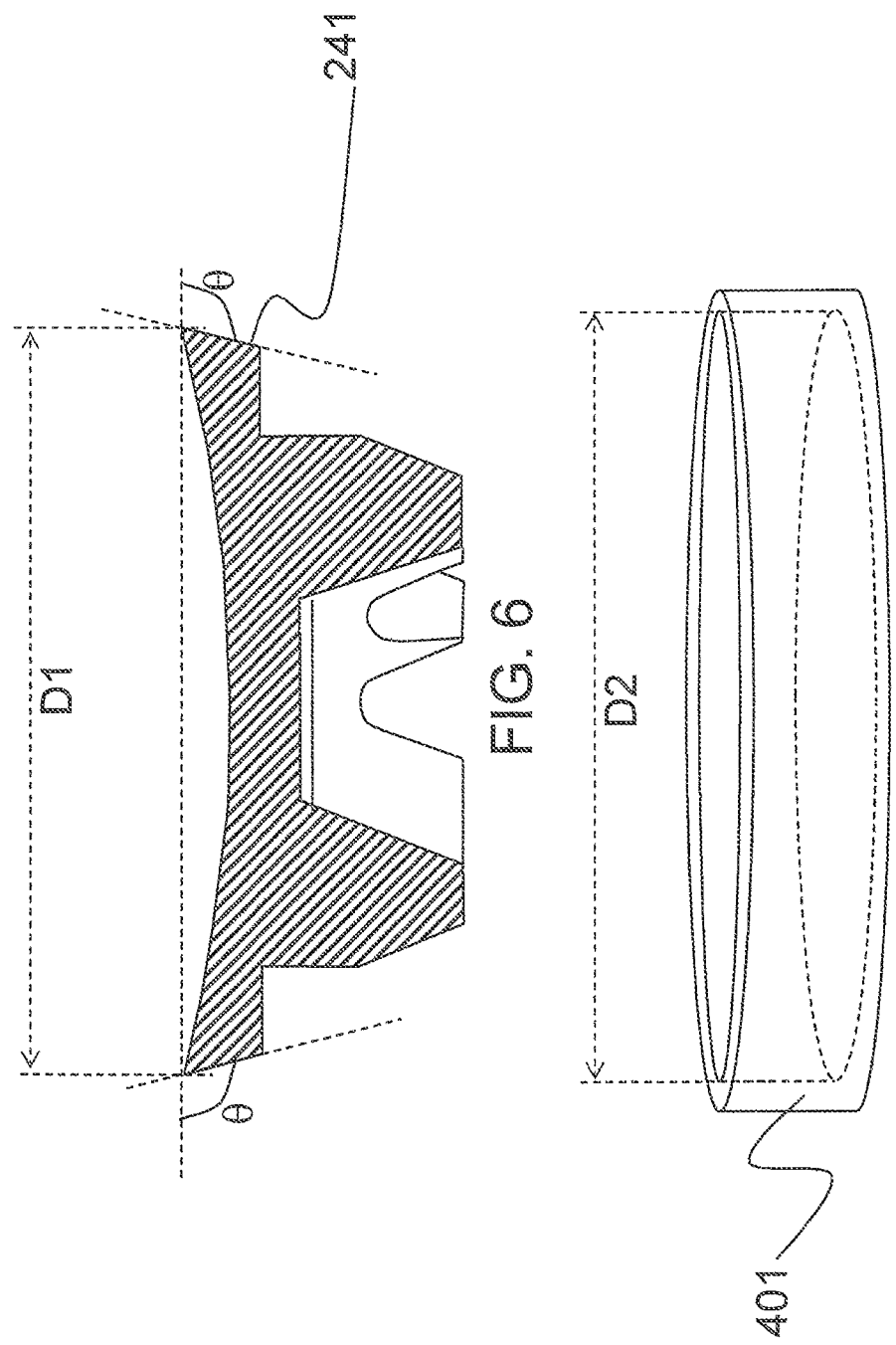

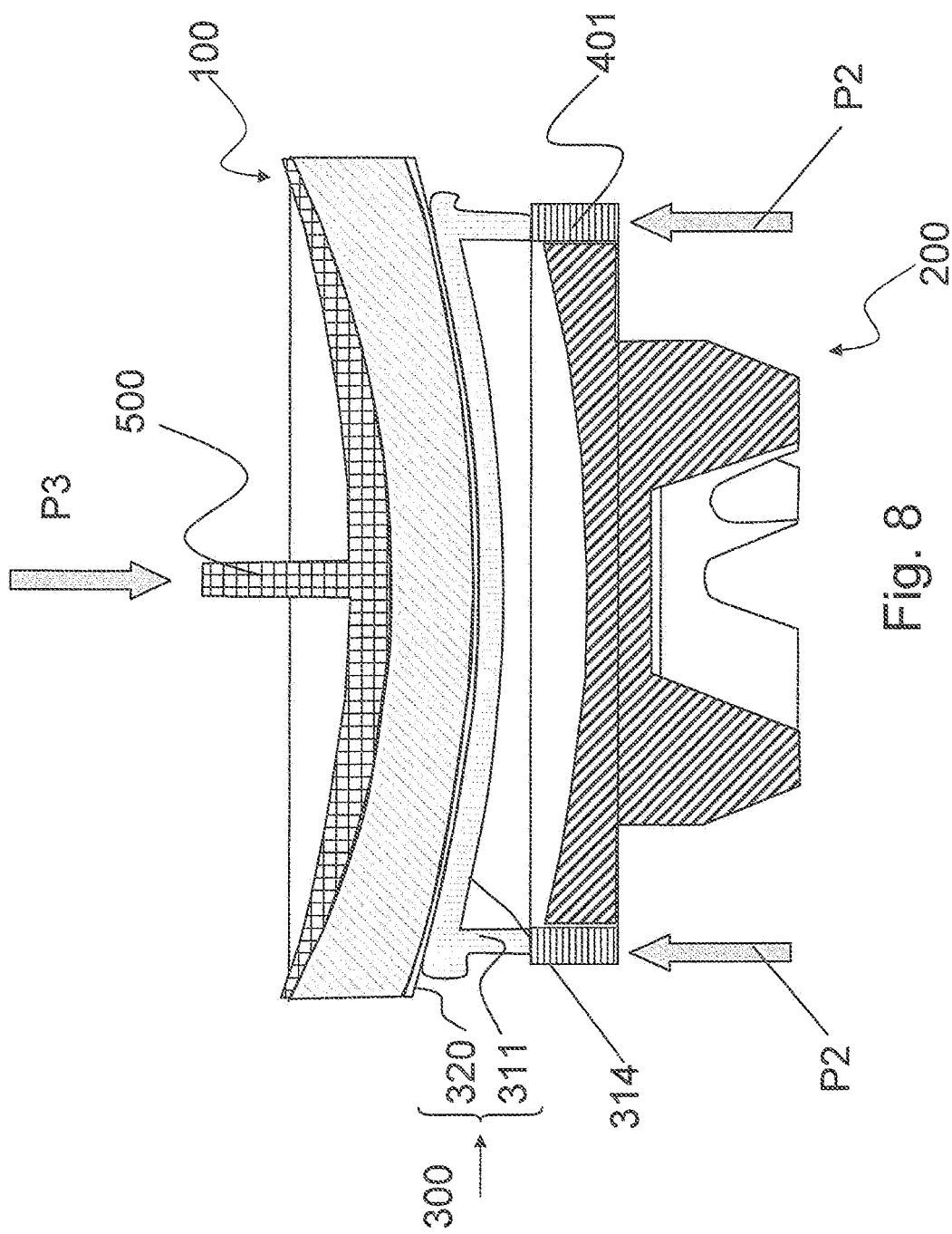

METHOD FOR BLOCKING AN OPTICAL LENS COMPONENT

RELATED APPLICATIONS

This is a U.S. national stage application under 35 USC § 371 of application No. PCT/EP2013/076489, filed on Dec. 13, 2013. This application claims the priority of European application no. 12306579.9 filed Dec. 13, 2012, the entire content of which is hereby incorporated by reference.

FIELD OF THE INVENTION

The present invention relates generally to a lens blocking and deblocking method and device for use in adhering an ophthalmic lens to a lens holding block employed with conventional machining, grinding and processing equipment in the generation of ophthalmic lenses.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The process of preparing optical or ophthalmic lenses begins with an unfinished or semi-finished glass or plastic lens blank. Typically a semi-finished lens blank has a finished polished front surface and an unfinished back surface. By grinding away material from the back surface of the lens blank the required corrective prescription is generated. Thereafter the surface having had the corrective prescription imparted thereto is polished and the peripheral edge of the thus processed lens blank is provided with a final desired contour thereby establishing a finished optical or ophthalmic lens. The lens blank can be either a plastic or a glass lens blank.

During these various processing operations the lens blank is securely maintained in accurate alignment and in place on a lens holding block. This procedure is often referred to as "lens blocking".

Various materials are employed to secure the lens blank to the lens holding block. These materials include glues, pitch and low temperature fusible metal alloys. The use of glues and pitch, in addition to being messy, suffers the further disadvantage of generally being non-reusable or non-reclaimable. While the prior art use of low temperature metal alloys eliminated some of these disadvantages experienced with the use of glues and pitch, nonetheless, the use of these metal alloys, both in their preparation and their reclamation caused significant environmental and health hazards especially since these alloys were most often fabricated from such metals as cadmium, tin, lead and bismuth. Of these metals, lead and cadmium are the most toxic. Lead is strong protoplasmic poison and can be introduced into the body by ingestion, inhalation and skin absorption. Cadmium poisoning is similar to lead in many ways and is introduced into the body in the same way as lead. Like lead, cadmium is stored in the liver, kidney and bone. Procedures for the formulation of such alloys and reclamation processes so as to enable its re-use as a material to secure a lens blank to a lens holding block thus exposes workers to serious environmental and heal the hazards. The formation of these alloys often is accomplished through the use of powdered or particulate metals which are subjected to a sintering and heat treating process. Fumes and/or dust particles of these metals are released to the ambient atmosphere thereby creating environmental and health hazards for those formulating these alloys. The same hazards exist for those attempting to reclaim the used low temperature metal alloy blocking material.

To overcome these issues, organic low shrinkage materials have been developed to be used as lens blocking materials.

U.S. Pat. No. 6,036,313 in the name of 3M Innovative Properties Company discloses examples of compound families suitable for lens blocking with thermoplastic materials.

The disclosed blocking compositions have many advantages over traditional metal alloy materials. For example, the lens blocking compositions are non-toxic, environmentally safe, and preferably biodegradable. The materials preferably can be used with existing processing equipment and may be recycled. An ophthalmic lens holding block can be used that comprises a solidified mass of a thermoplastic blocking composition. The blocking composition may comprise a homopolymer or copolymer of 5 epsilon-caprolactone, and preferably has a number average molecular weight of at least 3,000, a mean bending modulus of at least 69 MPa at 21° C., or a mean flexural strength of at least 1 MPa at 21° C. The composition is solid at 21° C. and has a sufficiently low melting or softening point such that the composition may be placed adjacent to an ophthalmic lens blank while at its melting or softening point without damaging the lens blank. The composition also has sufficient adhesion to a lens blank or to a lens blank coating or tape to hold an ophthalmic lens during a generating procedure.

U.S. Pat. No. 6,036,313 discloses a method of holding an ophthalmic lens blank, comprising the steps of:

providing a lens blocking composition as described above;

heating the lens blocking composition to its melting or softening point;

providing a blocking material receiving cavity against the lens blank;

forming the ophthalmic lens blocking composition into the receiving cavity; and allowing the composition to solidify.

Alternatively, a method of holding an ophthalmic lens blank is described, comprising the steps of:

providing an ophthalmic lens block comprising a solidified mass of a thermoplastic blocking composition, and preferably comprising a heat absorbing material;

heating the surface of the lens blocking composition to its melting or softening point;

positioning a lens blank against the softened surface of the lens blocking composition; and allowing the composition to resolidify.

However the inventors have noticed that the solution disclosed in U.S. Pat. No. 6,036,313 suffers of following drawbacks:

First, even some efforts were made for applying a low amplitude pushing force on the thermoplastic layer, lens breakage still occur due to the fact that the pushing force is applied locally. The lens breakages occur especially when the lens thickness is low.

Secondly, the disclosed blocking/deblocking method requires the use of two adhesive tapes for bonding of the optical lens to the thermoplastic material layer and to the holding unit assembling surface. Those tapes are quite expensive and cannot be reusable. This has a negative impact for cost of this method.

Accordingly, there remains a need for improving deblocking operations of a lens component, either a sole lens blank or a coated or tape covered lens blank, fixed on a thermoplastic block of an ophthalmic lens block.

Thus, the goal of the present invention is to improve the known deblocking methods to enhance the quality of resulting lens avoiding lens break, and to propose a blocking method and a machining tool adapted to this new deblocking method.

SUMMARY OF THE INVENTION

One aspect of the present invention is to provide a method of deblocking an assembly from a lens holding block 200, said assembly comprising an ophthalmic lens component 100, a first layer 320 consisting of a one-side adhesive tape and a second layer 310 comprising a hardened thermoplastic material, the optical lens component 100 having a bottom surface 120 covered at least partially with the first layer 320, the hardened thermoplastic material being adhesively fastened to said first layer 320 and being arranged on an upper assembling surface 210 of the lens holding block 200, said holding block 200 comprising external side parts 241 covered by the second layer 310, parts of the second layer 310 covering at least partially said external side parts 241 and forming a flange 311 mechanically fastened to the holding unit 200, said method comprising a step of: T10 applying a second pushing force P2 on the flange 311 so as the thermoplastic layer 310 is separated from the holding block 200, wherein the second pushing force P2 is applied uniformly on said flange 311.

Another aspect of the present invention is directed to a method for blocking an optical lens component 100 on a holding unit 200 comprising a bottom part 230 to be inserted and fixed in a lens machining tool 400 and an upper part 250 comprising an upper assembling surface 210 and external side parts 241, said method comprising steps of:

S10 providing the optical lens component 100 with a layer 320 consisting of a one-side adhesive tape arranged on a bottom surface 120 of said optical lens component 100 such as the adhesive tape side covers at least partially said bottom surface 120;

S20 providing a thermoplastic material arranged on the upper assembling surface 210, wherein the thermoplastic material is heated to a temperature at which at least a part of the thermoplastic material flows under moderate pressure;

S30 placing the optical lens component 100 with the layer 320 on the thermoplastic material when the thermoplastic material is soften or melted;

S40 applying a first pushing force P1 on the optical lens component 100, such as the soften or melted thermoplastic material spreads between said layer 320 and the upper assembling surface 210 and covers at least partially said external side parts 241, wherein when the thermoplastic material is hardened, said spread thermoplastic material forms a flange 311 which is mechanically fastened to the holding unit 200 and which is also adhesively fastened to said layer 320.

Another aspect of the present invention is directed to a lens holding unit 200 comprising a bottom part 230 to be inserted and fixed in a lens machining tool 400, and an upper part 250 comprising an upper assembling surface 210 and external side parts 241; wherein said external side parts 241 are arranged so as when a soften or melted thermoplastic material spreads onto the assembling surface 210 under an external pressure, it covers at least partially said external side parts 241, and when the spread thermoplastic material is hardened, the thermoplastic material covering said external side parts 241 forms a flange 311 which is mechanically fastened to the holding unit 200.

Another aspect of the invention is directed to a lens machining tool 400 for co-operation with a lens holding unit 200 according to any claim 9 or 10, wherein said lens machining tool 400 is arranged for receiving and fixing said holding unit 200 by fastening said bottom part 230, wherein said holding unit 200 and said lens machining tool 400 are arranged for letting free an open space around the external side parts 241 of the holding unit 200 when the holding unit 200 is fixed within said lens machining tool, so as when a soften or melted thermoplastic material spreads onto the assembling surface 210 under an external pressure, it covers at least partially said external side parts 241 and fills at least partially said open space, and when the spread thermoplastic material is hardened a flange 311 is formed which is mechanically fastened to the holding unit 200.

BRIEF DESCRIPTION OF THE DRAWINGS

The invention will be better understood and illustrated by means of the following embodiments and execution examples, in no way limitative, with reference to the appended figures on which:

FIG. 6 shows a cross sectional view of a holding block according to an embodiment of the present invention;

FIG. 7 shows a perspective view of a cylindrical ring piece used in deblocking method according to the present invention;

FIG. 8 shows a cross sectional view of an ophthalmic lens component involving in a preferred embodiment of a blocking method according to the present invention;

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

The wording "upper" or "on" and "bottom" or "under" indicates positions relative to the ophthalmic lens component when it is arranged so as the edge of the ophthalmic lens component to be machined is substantially situated in a horizontal plane.

Said position is purely conventional and the ophthalmic lens component can be machined in a non horizontal position.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
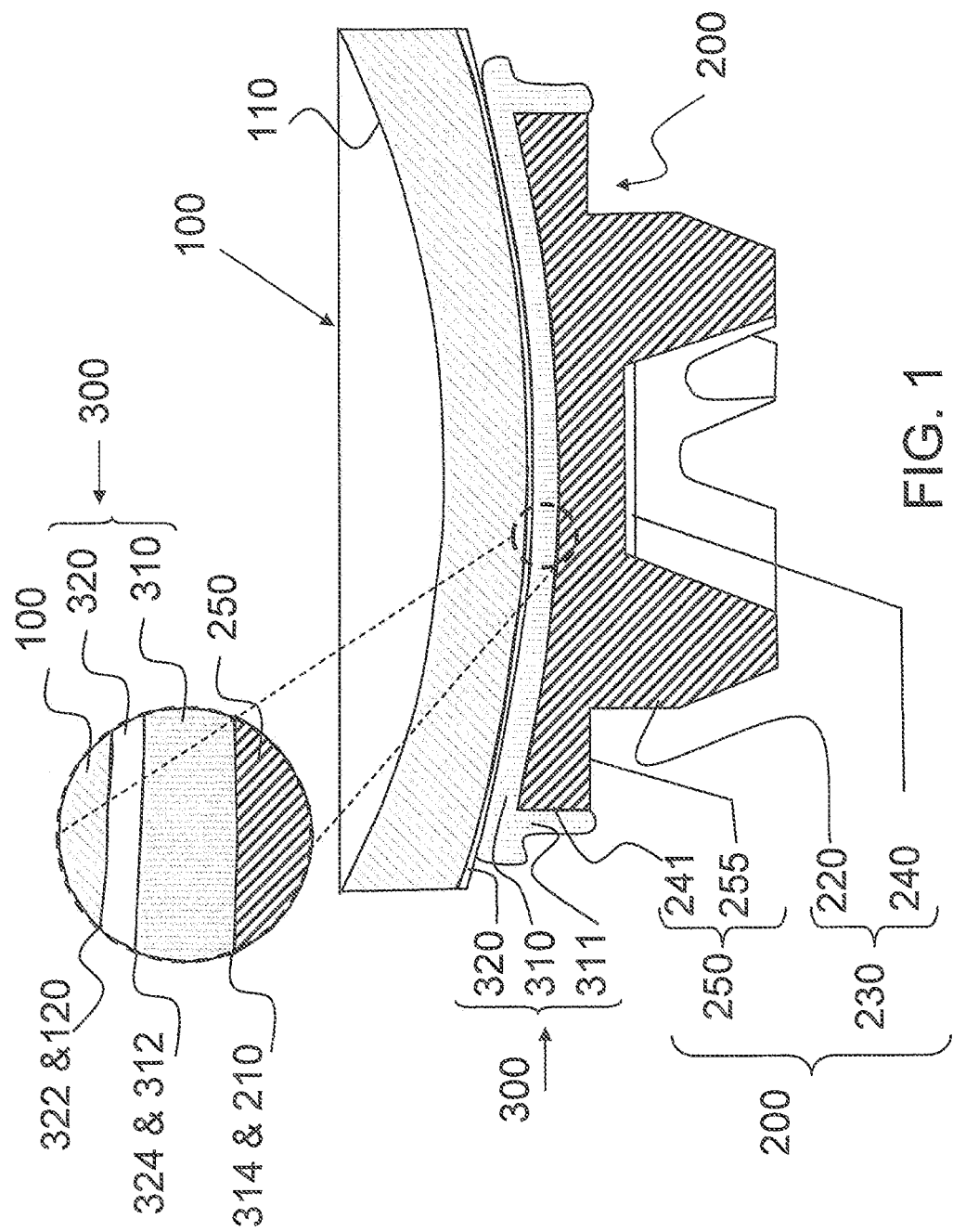
FIG. 1 shows a cross sectional view of an ophthalmic lens component blocked on a holding unit by a method of blocking according the present invention.

As shown on FIG. 1, an ophthalmic lens component 100 is secured on a lens holding block 200 thanks to fixing means 300. The edge of the ophthalmic lens component 100 is substantially situated in a horizontal plane.

The upper surface 110 of the ophthalmic lens component 100 is a surface to be machined, as for an example to be grinded and/or polished. The ophthalmic lens component 100 can be further edged.

The bottom surface 120 of the ophthalmic lens component 100 contacts the upper surface of the fixing means 300.

According to the present invention, an "ophthalmic lens component" may be an ophthalmic lens which surfaces have already been machined, a semi-finished ophthalmic lens blank with a polished front surface, an ophthalmic lens blank with two unfinished surfaces. The ophthalmic lens component can be made for example, but not limited to, of plastic or glass.

More generally, any combination of material suitable to obtain an optical system may be used. One or two surfaces of the optical lens may be coated.

Thus, an "ophthalmic lens component" of the invention can be every optical part that needs to be machined, as for example to be cut and/or grinded and/or polished and/or edged and/or engraved, in order to provide a machined ophthalmic lens.

A fully machined ophthalmic lens according to the present invention is for example an ophthalmic lens which surfaces form an optical system that fits a desired prescription. Said machined ophthalmic lens can be edged when blocked according to the present invention or edged in a further processing step, as for an example edged by an eye care practitioner.

According to an embodiment, the ophthalmic lens component 100 is a semi-finished lens blank and the bottom surface 120 is a finished optical surface.

As for an example, the external diameter of the ophthalmic lens component 100 is between 50 mm and 100 mm, for example equal to 80 mm.

The lens holding block 200 is a block, metallic, which comprises an upper part 250 and a bottom part 230.

The bottom part 230 comprises means to orientate the lens holding block 200 in corresponding orientating means of a tool (not represented on FIG. 1) of a lens machining unit such as a lathe or another movement inducing machine. The tool may be a chuck or another fixing tool. Internal surface 240 of the lens holding block 200 may contact an upper surface of the tool. The bottom part 230 of the lens holding block 200 also comprises a central part 220 which is a cylindrical part to be squeezed by the fixing tool of the machining unit.

Upper part 250 has an external diameter larger than the diameter of the central part 220 and its bottom surface 255 may lay on the upper surface of the tool of the lens machining unit and may comprise positioning means. The upper part 250 also comprises an upper assembling surface 210 and external side parts 241. The edge of the upper assembling surface 210 is substantially situated in a horizontal plane.

According to an embodiment of the invention, said external side parts 241 are inclined by an angle in respect with the plane formed by the edge upper assembling surface 210 larger than 90 degrees as shown on FIG. 6 for example.

According to an embodiment of the invention, the lens holding block may be heat-conducting and can be a metallic part or any material suitable to let the heat propagate through said material. According to an embodiment of the present invention, the holding unit is made of aluminum alloy.

According to an embodiment of the invention, the fixing means 300 may be arranged between the upper assembling surface 210 of the lens holding block 200 and the bottom surface 120 of the ophthalmic lens component 100 and consists of two stacked layers where:
- the first layer is a thermoplastic layer 310 of thermoplastic material whose bottom surface 314 is arranged on the upper surface of the upper assembling surface 210; the thermoplastic material forms a flange 311 which is mechanically fastened to the holding unit 200 and which is also adhesively fastened to a second layer 320
- the second layer is a one-side adhesive tape 320 whose bottom surface 324 is arranged on the upper surface 312 of the layer of thermoplastic material; the bottom surface 120 of the ophthalmic lens component 100 is fixed on the upper surface 322 of the adhesive tape 320

According to the present invention, a "thermoplastic layer" is a layer of material which comprises at least a thermoplastic material. A thermoplastic material can be remelted or soften when being heated and remolded when cooling after melting or softening. Most thermoplastics are high molecular weight polymers whose chains associate through weak van der Waals forces (polyethylene); stronger dipole-dipole interactions and hydrogen bonding (nylon); or even stacking of aromatic rings (polystyrene). Many thermoplastic materials are addition polymers; e.g., vinyl chain-growth polymers such as polyethylene and polypropylene. The thermoplastic inorganic material may comprise additives (such as for example, plasticizers, stabilizers, pigments . . . ) and/or fillers (such as mineral and/or organic fillers, as for examples boron, carbon, clay, glass, cellulose, metals, oxides, aramide, polyamide, . . . , fillers may be of different geometry, such as for example grains, lamella, short or long fibers, . . . ). European patent application EP08305794 discloses thermoplastic materials that may be used for the thermoplastic layer.

According to an embodiment, the adhesive tape 320 has a pressure-sensitive adhesive surface and a tack-free adhesion promoting surface. The tape 320 assists in the firm bonding of the optical lens 100 to the thermoplastic material layer 310 and to the holding unit assembling surface 210.

According to an embodiment, the tapes are conformable, that is, they follow the curvature of the lens blanks without any wrinkles or air bubbles; and translucent, that is, they permit light to pass there through. As a result, the lens may be visually aligned in the appropriate device prior to blocking. Still further, when the tapes are removed from the lens, they leave virtually no adhesive residue. Thus, messy and time consuming cleaning operations need not be performed on the lens before it can be used.

Despite this clean removability, suitable tapes may exhibit excellent adhesion to the optical lens, to the thermoplastic material. Additionally, the tapes may be able to withstand the shear forces encountered during the machining operations. As a result, lenses are held in accurate position throughout these operations. An added benefit offered by using an adhesive tape is the protection provided to the optical lenses from thermal and mechanical shock.

The composition of the exposed surface of the tape (i.e., the non-adhesive surface away from the optical lens or from the upper assembling surface of the holding unit) may be selected so as to achieve the desired degree of adhesion with a particular thermoplastic material. Examples of suitable tapes are given in previously cited U.S. Pat. No. 6,036,313.

As for examples, tapes commercialized by the company 3M and referred as 1640 and 1641 are particularly suitable.

A 1641 adhesive tape commercialized by the company 3M comprises a baking made of polyethylene film covered by an acrylate adhesive.

Figure 2:
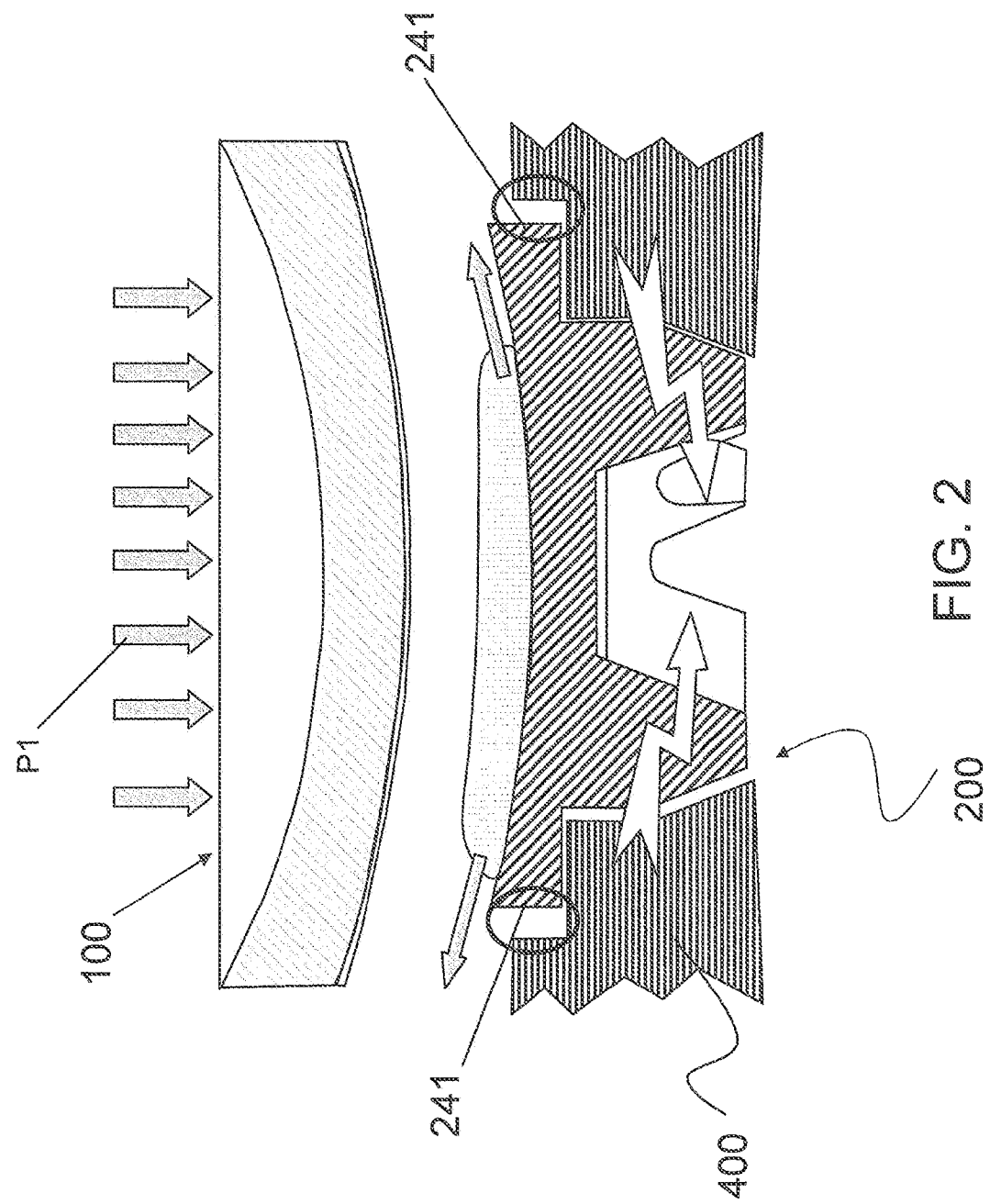
FIGS. 2 to 3 show cross sectional views of an ophthalmic lens component involving in successive steps of a blocking method according to the present invention.

On FIG. 2, one shows holding block 220 comprising a bottom part inserted and fixed in a lens machining tool 400 partially represented and an optical lens component 100 having its bottom surface 120 covered by at least partially by the adhesive face of a one-side adhesive tape of the above-mentioned type. One also shows a block of thermoplastic material of the above-mentioned type arranged on the upper assembling surface 210 of the holding block 220.

Said lens machining tool 400 for is adapted for cooperating with said lens holding unit 200. In particular, the lens machining tool is arranged for receiving and fixing said holding unit 200 by fastening the bottom part 240 of the holding unit. Both the holding unit and the lens machining tool are arranged for letting free an open space around the external side parts 241 of the holding unit when the holding unit 200 is fixed within said lens machining tool. On FIG. 2, the free-open space is signaled by a circle.

According to an embodiment of the present invention, the upper surface 312 of the thermoplastic block is heated, for example with UV or IR lamps, so as to let a thin blocking material zone melt or soften. The lens component 100 is then placed onto said molten or softened zone and a moderate pressure P1 is applied onto the lens component.

Figure 3:
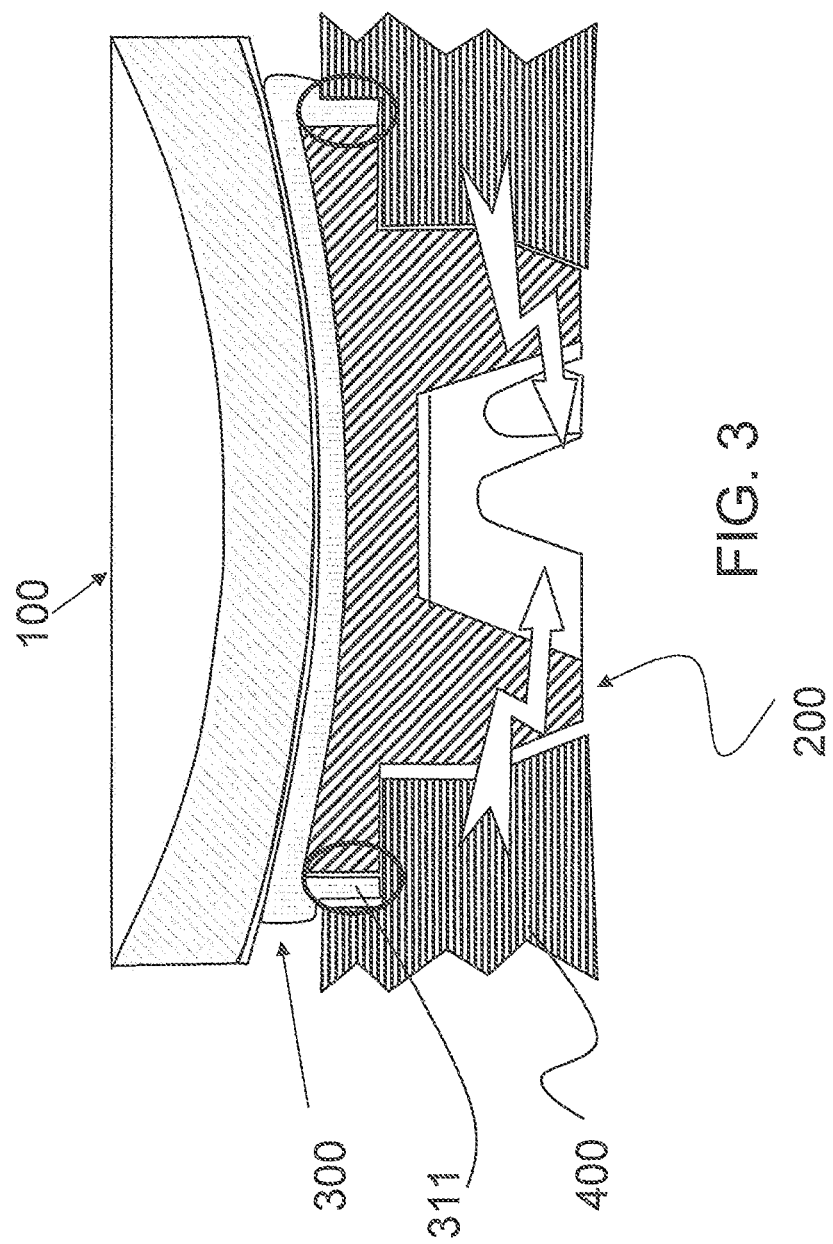

As shown on FIG. 3, when the softened or melted thermoplastic material spreads onto the assembling surface 210 under the external pressure, it pours into the parts of the free space. Then, the soften or melted thermoplastic material covers at least partially the external side parts 241 and fills at least partially said open space. When the spread thermoplastic material is hardened a flange 311 is formed which is mechanically fastened to the holding unit 200. If the holding unit is separated of the lens machining tool, one gets an assembly comprising the optical lens element the fixing means 300 and the holding unit as shown in FIG. 1.

Advantageously, the method for blocking an optical lens component according the invention further comprises a step of S45 cooling said thermoplastic material carried out following said step of S40 applying the first pushing force P1. This cooling step quickens the whole method.

Various holding unit 200, with various diameter exist. Advantageously, the lens machining tool 400 is configured to let an open free space having a unique thickness whatever the holding unit 200.

Advantageously, the lens holding block (200) is beforehand inserted and fixed in a lens machining tool 400, wherein the steps S20, S30 S40, S45 following to the step of S10 providing the optical lens component 100 are carried out by said lens machining tool 400

Advantageously, the lens machining tool 400 has a top part acting as a multi-part diaphragm. This has the advantage to keep constant the thermoplastic material hardening duration independently of the holding unit. With this configuration, one limits the use of thermoplastic material for small diameter holding unit 200. If every internal parts of the diaphragm are connected to a dedicated cooling station, this also contributes to shorten the material hardening duration with respect to a situation where a single cooling station is used for cooling a monolithic lens cooling tool.

Advantageously, prior to the step S40 of applying a first pushing force P1 on the optical lens component 100, the diaphragm is activated for approaching and surrounding closely its internal part from the external side parts 241 of the holding unit 200 and letting a free space open between the holding unit and the lens machining tool.

Once, the thermoplastic material is hardened, the diaphragm is activated to keep the internal parts of the diaphragm far from the external side parts 241 of the holding unit 200

The lens component is securely blocked after the cooling of the blocking material and the lens component is machined using conventional tools to provide grinding and/or polishing and/or edging.

After machining the ophthalmic lens component, it is deblocked and detached from the blocking material.

According to the invention, the ophthalmic lens component is deblocked by applying a pushing force on the flange 311 so as the thermoplastic layer 310 is separated from the holding block 200, wherein the second pushing force P2 is applied uniformly on bottom parts of the flange 311.

According to an embodiment of the invention, prior to or when applying a pushing force; the deblocking method of the invention may further comprise a step of warming the thermoplastic layer at a temperature greater or equal to 30° C. and smaller or equal to 70° C.

Advantageously, warming the thermoplastic prior to or when applying the pushing force allows to reduce the intensity of the pushing force and the risk of deforming the ophthalmic lens component during the deblocking step.

Advantageously, the method for deblocking an assembly from a lens holding block according the invention comprises a further step of T5 heating said flange 311 carried out prior to said step of T10 applying said second pushing force P2.

According to an embodiment, only the bottom part of the holding unit 200, as for an example the lower part 230, is directly heated by the heating means and the heat propagates then through the holding unit to the upper part 250 thanks to heat conduction.

It is thus possible to control precisely the heat amount brought to the layer of thermoplastic material 310 and to avoid thermal shock on the optical lens 100. Optical quality of the optical lens can thus be advantageously preserved.

Heating the holding unit 200 allows deblocking the optical lens without significant heating of the optical lens.

After heating the bottom surface 314 of the thermoplastic material layer 310 thanks to conductive heating through the holding unit 200, a zone of thermoplastic material close to said surface 314 and especially close to external side parts 241 melts or softens.

The ophthalmic lens component 100 and the fixing means 300 consisting of the thermoplastic layer 310 and the adhesive tape 320, remain together.

According to an embodiment of the invention, the flange 311 is placed in a symmetrical manner around the external side parts 241 the pushing force is applied simultaneously and uniformly on the whole flange 311 so as to have a symmetrical application of pushing force on the whole periphery of the optical lens element.

Advantageously, applying symmetrically a pushing force on flange, allows reducing the stress applied to the ophthalmic lens component during the deblocking method.

Reducing the stress applied to the ophthalmic lens component reduces the risk of damaging the ophthalmic lens during the deblocking. Indeed, the inventors have observed that when a strong moment is applied to the ophthalmic lens component the surface of the ophthalmic lens may be deformed.

According to the invention, the pushing force may be obtained by any pushing means known from the person skilled in the art.

According to an embodiment of the invention, the upper assembling surface 210 is circular, and external side parts 241 have a first diameter D1, wherein a cylindrical ring piece 401 whose internal diameter D2 is slightly larger than the diameter radius D1, wherein the step of applying the pushing force P2 consists in moving the cylindrical ring piece 401 with respect to the lens holding block 200 so as the cylindrical ring piece 401 exerts said pushing force P2 on said flange 311.

According to an embodiment of the invention, the lens holding block 200 is inserted and fixed in a lens machining tool 400, wherein the steps T5, T10 are carried out by using said lens machining tool 400.

Advantageously, the melting or softening point of the thermoplastic of the thermoplastic material is greater or equal to 35° C. and smaller or equal to 75° C.

Figure 4:
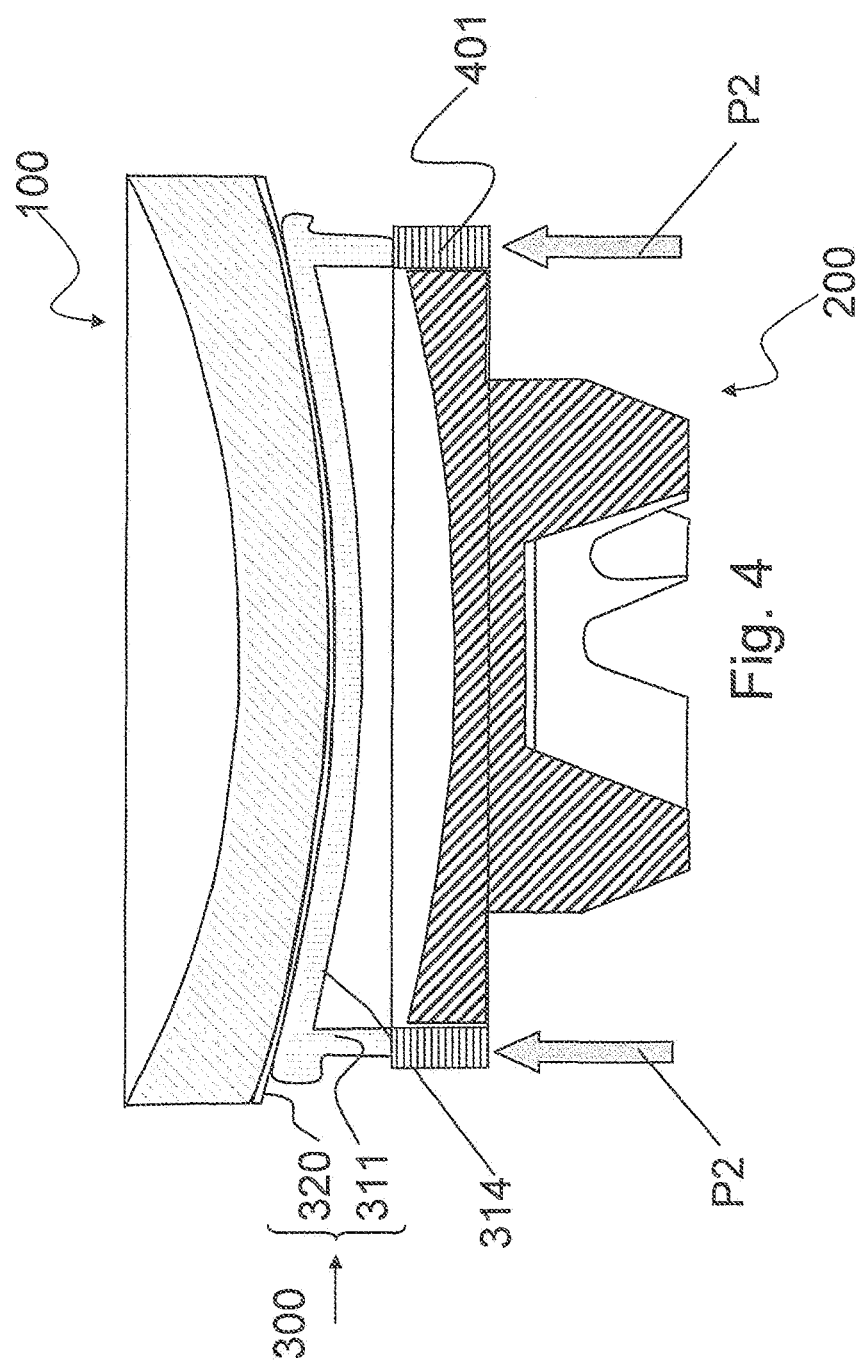
FIGS. 4 to 5 show cross sectional views of said blocked ophthalmic lens component involving in successive steps of a deblocking method according to the present invention.
Figure 5:
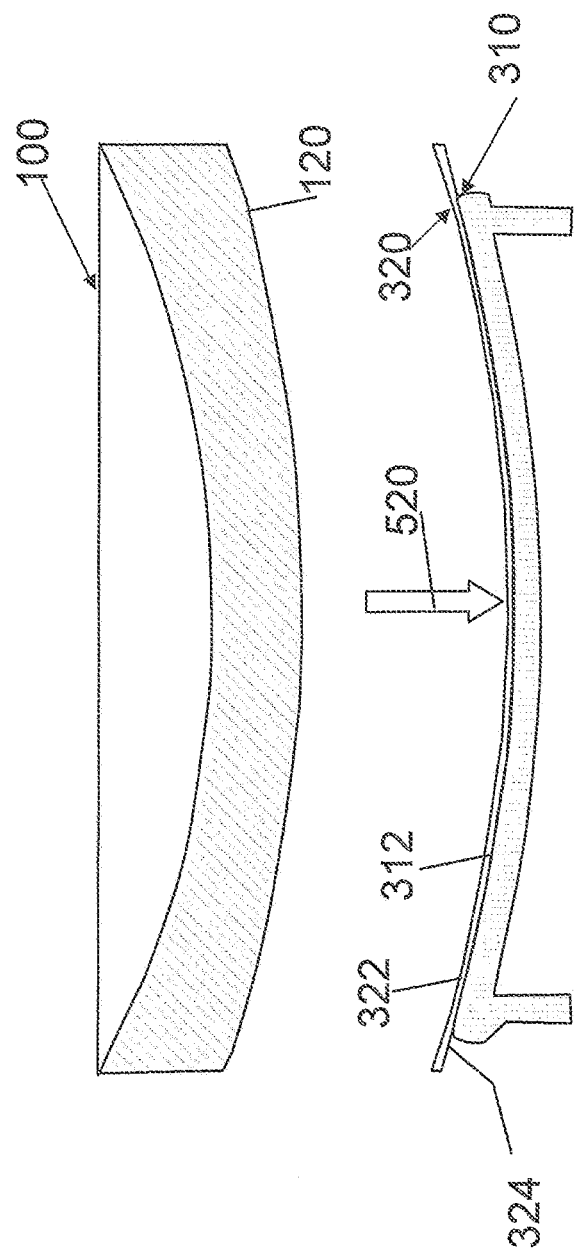

Two consecutive deblocking steps of an embodiment of the invention are shown on FIGS. 4 to 5 respectively.

As shown on FIG. 4, the holding unit 200 is heated through heating means 400 on FIG. 4. Heating means can be for example IR or UV lamps, as well as hot liquids, and provided by contacting a heated metal part or by other conductive heating means. When the thermoplastic material has reached a temperature where it melts, the second pushing force is applied on the flange 311 and then the holding block is separated therefrom.

According to a further step illustrated on FIG. 5, the second layer consisting of the adhesive tape 320 is peeled or pulled according to arrow 520. The first layer and the second layer remain together after being separated from the ophthalmic lens component 100.

The lens holding block can be rapidly reused to prepare another lens blocking device.

Thanks to the adhesive tapes the thermoplastic material as well as the lens holding unit are not contaminated during the blocking/machining/deblocking steps and are immediately reusable.

Advantageously, a flexible pad 500 is applied on the whole upper surface 110 of the ophthalmic lens component 100, and simultaneously to the step T10 of applying a second pushing force P2 on the flange 311, a third pushing force P3 is applied on said pad 500 to exert a pressure on the ophthalmic lens component 100 for deblocking it from the holding unit 200. Then under the conjunction of the second and the third pushing forces P2, P3, the assembly is smoothly separated from the holding unit 200 as shown on the FIG. 8. Applying the third pushing force simultaneously to the application of the second pushing force avoids any stress to the ophthalmic lens component 100 during lens deblocking operations.

Advantageously, the third pushing force P3 has an amplitude lower or equal to the amplitude of the second pushing force P2. The direction of the second and third pushing forces F2, F3 are identical. The sense of the second pushing force F2, is opposed to the sense of the third pushing force F3.

According to an embodiment of the invention, the lens machining tool comprises means for applying a first pushing force P1 on an optical lens component 100 which presses a layer 310 comprising a thermoplastic material, beforehand soften or melted, arranged on the upper assembling surface 210 of said holding unit 200.

According to an embodiment of the invention, the lens machining tool further comprises means for heating the thermoplastic material placed on the upper assembling surface 210.

According to an embodiment of the invention, the lens machining tool further comprises means for cooling the thermoplastic material filling the open space.

The invention has been described above with the aid of embodiments without limitation of the general inventive concept. In particular the present invention provides a method for blocking and/or deblocking all kinds of optical lenses, particularly ophthalmic lenses, e.g. single vision (spherical, torical), bi-focal, progressive, aspherical lenses etc . . . , semi-finished optical lenses and/or blanks, blanks for manufacturing optical lenses.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

The invention claimed is:

1. A lens holding unit comprising a bottom part to be inserted and fixed in a lens machining tool, and an upper part comprising an upper assembling surface and external side parts,
wherein the lens holding unit is adapted to the lens machining tool so that an open space between the external side parts of the lens holding unit and an internal side wall of the lens machining tool is formed when the lens holding unit is fixed to the lens machining tool and
wherein said external side parts are arranged so that when a softened or melted thermoplastic material spreads onto the assembling surface under an external pressure, the softened or melted thermoplastic material covers at least partially said external side parts and fills at least partially said open space, and when the spread thermoplastic material is hardened, the thermoplastic material covering said external side parts forms a flange shaped by the external side parts of the lens holding unit and the internal side wall of the lens machining tool and which is mechanically fastened to the lens holding unit.

2. The lens holding unit according to claim 1,
wherein the upper assembling surface comprises an edge substantially situated in a horizontal plane, and
wherein said external side parts are inclined by an angle larger than 90 degrees with respect to said horizontal plane.

3. A lens machining tool for co-operation with a lens holding unit according to claim 1,
wherein said lens machining tool is arranged for receiving and fixing said lens holding unit by fastening said bottom part.

4. The lens machining tool according to claim 3, further comprising a pusher for applying a first pushing force on an optical lens component to
press a layer comprising a thermoplastic material, previously softened or melted, arranged on the upper assembling surface of said lens holding unit.

5. The lens machining tool according to claim 3, further comprising a heater for heating the thermoplastic material placed on the upper assembling surface.

6. The lens machining tool according to claim 3, further comprising a cooler for cooling the thermoplastic material filling the open space.

7. The lens machining tool according to claim 3,
wherein the upper assembling surface is circular, with external side parts having a first radius,
wherein the lens machining tool further comprises a cylindrical ring piece with an internal radius is slightly greater than the first radius, and
wherein the lens machining tool further comprises a pusher for applying a second pushing force on the flange by said cylindrical ring piece so as the thermoplastic layer is separated from the lens holding unit, wherein the second pushing force is applied uniformly on a bottom part of said flange.

8. A method for blocking an optical lens component on a lens holding unit comprising a bottom part to be inserted and fixed in a lens machining tool and an upper part comprising an upper assembling surface and external side parts, said method comprising the steps of:
inserting and fixing beforehand the lens holding unit in the lens machining tool so that an open space is formed between the external side parts of the lens holding unit and an internal side wall of the lens machining tool;
providing the optical lens component with a layer consisting of a one-side adhesive tape arranged on a bottom surface of said optical lens component such that the adhesive tape side covers at least partially said bottom surface;
providing a thermoplastic material arranged on the upper assembling surface, wherein the thermoplastic material is heated to a temperature at which at least a part of the thermoplastic material flows under moderate pressure;
placing the optical lens component with the layer on the thermoplastic material when the thermoplastic material is soften or melted;
applying a first pushing force on the optical lens component, such that the softened or melted thermoplastic material spreads between said layer and the upper assembling surface and covers at least partially said external side parts and fills at least partially said open space, wherein when the thermoplastic material is hardened, said spread thermoplastic material forms a flange shaped by the external side parts of the lens holding unit and the internal side wall of the lens machining tool and which is mechanically fastened to the holding unit and which is also adhesively fastened to said layer.

9. The method according to claim 8, further comprising cooling said thermoplastic material after applying the first pushing force.

10. The method according to claim 8,
wherein the steps of providing the thermoplastic material, of placing the optical lens component, and of applying the first pushing force, after the step of providing the optical lens component, are carried out by said lens machining tool.

\* \* \* \* \*